US006896944B2

(12) United States Patent
Ylitalo et al.

(10) Patent No.: US 6,896,944 B2
(45) Date of Patent: May 24, 2005

(54) IMAGED ARTICLES COMPRISING A SUBSTRATE HAVING A PRIMED SURFACE

(75) Inventors: Caroline M. Ylitalo, Stillwater, MN (US); Bret W. Ludwig, Oakdale, MN (US); David J. Kinning, Woodbury, MN (US); Ernest M. Rinehart, North St. Paul, MN (US); Jennifer L. Lee, Eagan, MN (US); Oh Sang Woo, Woodbury, MN (US); Richard L. Severance, Stillwater, MN (US); Richard F. Theissen, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 325 days.

(21) Appl. No.: 09/896,863

(22) Filed: Jun. 29, 2001

(65) Prior Publication Data

US 2003/0054139 A1 Mar. 20, 2003

(51) Int. Cl.[7] ............................ B32B 33/00; B32B 9/00

(52) U.S. Cl. ................... 428/42.1; 428/195.1; 428/213; 428/332; 428/480; 428/500; 428/32.1; 428/32.35

(58) Field of Search ............................ 428/42.1, 195.1, 428/213, 332, 480, 500, 32.1, 32.35, 195, 323, 354

(56) References Cited

U.S. PATENT DOCUMENTS

| | | | | |
|---|---|---|---|---|
| 5,102,737 A | | 4/1992 | Josephy et al. | 428/411.1 |
| 5,270,368 A | | 12/1993 | Lent et al. | 524/236 |
| 5,424,355 A | | 6/1995 | Uemae et al. | |
| 5,474,843 A | * | 12/1995 | Lambert et al. | 428/32.24 |
| 5,478,631 A | * | 12/1995 | Kawano et al. | 428/212 |

(Continued)

FOREIGN PATENT DOCUMENTS

| | | |
|---|---|---|
| EP | 0569003 | 11/1993 |
| EP | 0 952 005 | 10/1999 |
| JP | 61132377 | 6/1986 |
| WO | WO 97/18090 | 5/1997 |
| WO | WO 97/47480 | 12/1997 |
| WO | WO 98/04418 | 2/1998 |
| WO | WO 99/06489 | 2/1999 |
| WO | WO 99/29788 | 6/1999 |
| WO | WO 99/64249 | 12/1999 |
| WO | WO 00/01536 | 1/2000 |
| WO | WO 00/41890 | 7/2000 |
| WO | WO 00/47422 | 8/2000 |
| WO | WO 00/52532 | 9/2000 |
| WO | WO 02/21167 | 3/2002 |
| WO | WO 02/31016 | 4/2002 |
| WO | WO 02/062894 | 8/2002 |

OTHER PUBLICATIONS

"Practical Consideration for Using UV Reactive Inks in Piezo DOD Printheads", 1999 International Conference on Digital Printing Techniques, Richard J. Baker, 5 pages.

*Primary Examiner*—B. Shewareged
(74) *Attorney, Agent, or Firm*—Carolyn A. Fischer

(57) ABSTRACT

The present invention relates to an imaged article comprising a substrate having a primed surface layer. The primed surface layer is comprised of a base polymer having a solubility parameter, molecular weight (Mw) and glass transition temperature within a specified range. The presence of the primer improves the overall image quality by improving at least one property including ink uptake, dot gain, color density and/or ink adhesion. Preferred primer compositions are soluble at least in part in the ink composition resulting in an increase in ink layer thickness that further improves the durability and/or day/night color balance. A variety of substrates may be primed including various sheeting for traffic control signage and commercial graphic films for advertising and promotional displays.

22 Claims, 1 Drawing Sheet

U.S. PATENT DOCUMENTS 5,610,215 A 3/1997 Nonweiler et al.
5,645,899 A 7/1997 Unterberger ................ 427/558
5,804,301 A 9/1998 Curatolo ..................... 428/352
5,837,351 A 11/1998 Chernovitz ................. 428/195
5,882,388 A 3/1999 Adair et al. ............... 106/31.6
5,908,495 A * 6/1999 Nohr et al. .............. 106/31.32
5,910,359 A * 6/1999 Kobayashi et al. ...... 428/32.15
5,981,113 A 11/1999 Christian ....................... 430/9
5,998,534 A 12/1999 Tang et al. ................. 524/548
6,037,050 A * 3/2000 Saito et al. .............. 428/32.26
6,054,208 A 4/2000 Rega et al. ................. 428/323
6,114,406 A 9/2000 Caiger et al. ............... 522/121
6,130,308 A 10/2000 Rink et al.
6,238,804 B1 * 5/2001 Atherton et al. ........... 428/32.1
6,492,005 B1 * 12/2002 Ohbayashi et al. ...... 428/32.29
2003/0021961 A1 * 1/2003 Ylitalo et al. ............... 428/195

* cited by examiner

IMAGED ARTICLES COMPRISING A SUBSTRATE HAVING A PRIMED SURFACE

FIELD OF THE INVENTION

The present invention relates to an imaged article comprising a substrate having a primed surface layer. The primed surface layer is comprised of a base polymer having a solubility parameter, molecular weight (Mw) and glass transition temperature within a specified range. The presence of the primer improves the overall image quality by improving at least one property including ink uptake, dot gain, color density and/or ink adhesion. Preferred primer compositions are soluble in the ink composition resulting in an increase in ink layer thickness that further improves the day/night color balance and/or durability. A variety of substrates may be primed including various sheeting for traffic control signage and commercial graphic films for advertising and promotional displays.

BACKGROUND OF INVENTION

A variety of print methods have been employed for imaging various sheet materials. Commonly employed print methods include gravure, off-set, flexographic, lithographic, electrographic, electrophotographic (including laser printing and xerography), ion deposition (also referred to as electron beam imaging [EBI]), magnetographics, ink jet printing, screen printing and thermal mass transfer. More detailed information concerning such methods is available in standard printing textbooks.

One of ordinary skill in the art appreciates the differences in these various print methods and recognizes that a combination of ink and receiving substrate that results in high image quality in one printing method often exhibits an entirely different image quality with another print method. For example, in contact printing methods such as screen printing, a blade forces the ink to advance and wet the receiving substrate. Image defects are typically due to a subsequent recession of the ink contact angle with the substrate. In the case of non-contact printing methods such as ink jet printing, the individual ink drops are merely deposited on the surface. In order to achieve good image quality, the ink drops need to spread, join together, and form a substantially uniform, leveled film. This process requires a low advancing contact angle between the ink and the substrate. For any given ink/substrate combination, the advancing contact angle is typically significantly greater than the receding contact angle. Accordingly, ink/substrate combinations that result in good image quality when printed with contact methods such as screen printing, often exhibit insufficient wetting when imaged with non-contact printing methods such as ink jet printing. Insufficient wetting results in low radial diffusion of the individual ink drops on the surface of the substrate (also referred to as "dot gain"), low color density, and banding effects (e.g. gaps between rows of drops).

Another important difference between screen printing and ink jet printing is the physical properties of the ink. Screen printing ink compositions typically contain over 40% solids and have a viscosity of at least two orders of magnitude greater than the viscosity of ink jet printing inks. It is not generally feasible to dilute a screen printing ink to make it suitable for ink jet printing. The addition of large amounts of low viscosity diluents drastically deteriorates the ink performance and properties, particularly the durability. Further, the polymers employed in screen printing inks are typically high in molecular weight and exhibit significant elasticity. In contrast, ink jet ink compositions are typically Newtonian.

Ink jet printing is emerging as the digital printing method of choice due to its good resolution, flexibility, high speed, and affordability. Ink jet printers operate by ejecting, onto a receiving substrate, controlled patterns of closely spaced ink droplets. By selectively regulating the pattern of ink droplets, ink jet printers can produce a wide variety of printed features, including text, graphics, holograms, and the like. The inks most commonly used in ink jet printers are water-based or solvent-based inks that typically contain about 90% organic and/or aqueous solvents. Water-based inks typically require porous substrates or substrates with special coatings that absorb water.

One problem, however, with ink jet inks is that ink compositions do not uniformly adhere to all substrates. Accordingly, the ink composition is typically modified for optimized adhesion on the substrate of interest. Further, good wetting and flow onto various substrates is controlled by the ink/substrate interaction. Preferably, the interaction results in a sufficiently low advancing contact angle of the ink on the substrate, as previously described. Accordingly, the image quality (e.g. color density and dot gain) of the same ink composition tends to vary depending on the substrate being printed.

Various approaches have been taken to improve image quality of water-based ink jet inks. For example, U.S. Pat. No. 4,781,985 relates to an ink jet transparency which exhibits the ability to maintain the edge acuity of ink patterns or blocks of the transparency. The transparency comprises a coating thereon which includes a specific fluorosurfactant. Ink dry times are improved upon utilizing an emulsion of a water insoluble polymer and a hydrophilic polymer as the coating on the transparency. The addition of a water insoluble polymer prevents film tackiness during handling, and by reducing water receptivity slightly, allows the ink droplets to spread before the ink solvent vehicle absorption take place.

SUMMARY OF THE INVENTION

The present invention relates to an imaged article comprising a substrate having a primed surface layer. The primed surface layer is comprised of a based polymer having a solubility parameter, molecular weight (Mw) and glass transition temperature within a specified range. The presence of the primer improves the overall image quality by improving at least one property including ink uptake, dot gain, color density and/or ink adhesion.

In preferred embodiments, the primer composition is soluble in the ink composition, resulting in an increase in ink layer thickness. Accordingly, in one aspect the present invention is an imaged article comprising a substrate comprising a primed surface layer having an average thickness of $t_1$; and an ink layer on said primed surface, said ink layer having a theoretical dry thickness of $t_2$ and an actual average dry thickness of $t_3$; wherein $t_3$ is greater than $t_2$. The actual ink layer thickness, $t_3$, is greater than $t_2$ by an amount ranging from about 25% of $t_1$ to an amount about equal to the sum of $t_2$ and $t_1$ and is preferably greater than $t_2$ by an amount of at least 50% of $t_1$. The ink layer preferably comprises an ink jetted image. The actual ink layer thickness, $t_3$, is preferably at least about 0.5 microns greater than $t_2$, more preferably at least 1.0 micron greater than $t_2$, and most preferably at least about 2 microns greater than $t_2$.

In another aspect, the present invention is a method of printing a non-aqueous ink comprising providing a substrate comprising a primed surface of thickness $t_1$; printing a non-aqueous ink on said primed surface, said ink having a theoretical dry thickness $t_2$ and an actual dry thickness $t_3$; wherein $t_3$ is greater than $t_2$ by an amount ranging from about 25% of $t_1$ to an amount about equal to the sum of $t_2$ and $t_1$.

In another aspect, the present invention is a method of printing a non-aqueous piezo ink comprising providing a substrate comprising a primed surface, said primed surface having a solubility parameter of $s_1$; printing a solvent-based piezo ink having a solubility parameter of $s_2$ on said primed surface; wherein the absolute value of the difference between $s_1$ and $s_2$ is less than about 1.5 $(cal/cm^3)^{1/2}$. The piezo ink has a viscosity from about 3 centipoise to about 30 centipoise at the printhead temperature.

In another aspect, the present invention is a method of printing comprising: providing a substrate comprising a primed surface layer said primed surface layer comprising a base polymer having:

i) a solubility parameter ranging from about 7 to about 10 $(cal/cm^3)^{1/2}$;

ii) a weight average molecular weight (Mw) ranging from about 30,000 g/mole to about 400,000 g/mole; and iii) a Tg ranging from about 30 to about 95° C.; and ink jet printing a solvent-based piezo ink composition on said primed surface.

The Mw of the base polymer is preferably greater than 60,000 g/mole and more preferably greater than 100,000 g/mole. The Tg of the base polymer preferably ranges from about 40° C. to about 80° C. The primed surface layer preferably has a dry thickness ranging from about 0.1 to about 50 microns.

The ink layer preferably has a black color density of at least about 1.5 and in the case of ink jet printing, an ink dot diameter of at least $[(2)^{1/2}]$/dpi wherein dpi is the print resolution in dots per linear inch. The ink layer comprises an ink that preferably exhibits at least about 80% adhesion to the primed surface portion according to ASTM D 3359-95A. Further, the primed surface portion preferably comprises a primer that exhibits at least about 80% adhesion to the sheet according to ASTM D 3359-95A. The primed surface portion optionally comprises at least one colorant.

Various polymers and polymer blends are suitable for use as the base polymer of the primed surface layer with acrylic resin(s), vinyl resin(s) and mixture thereof being preferred. Further, the primed surface portion may comprises crosslinked poly(meth)acrylate.

A variety of substrates may be primed including various retroreflective sheeting for traffic control signage and commercial graphic films for advertising and promotional displays. The substrate preferably comprises a polymeric sheet material such as an acrylic-containing film, a poly(vinyl chloride)-containing film, a poly(vinyl fluoride)-containing film, a urethane-containing film, a melamine-containing film, a polyvinyl butyral-containing film, a polyolefin-containing film, a polyester-containing film and a polycarbonate-containing film.

DETAILED DESCRIPTION OF THE INVENTION

Figure 1:
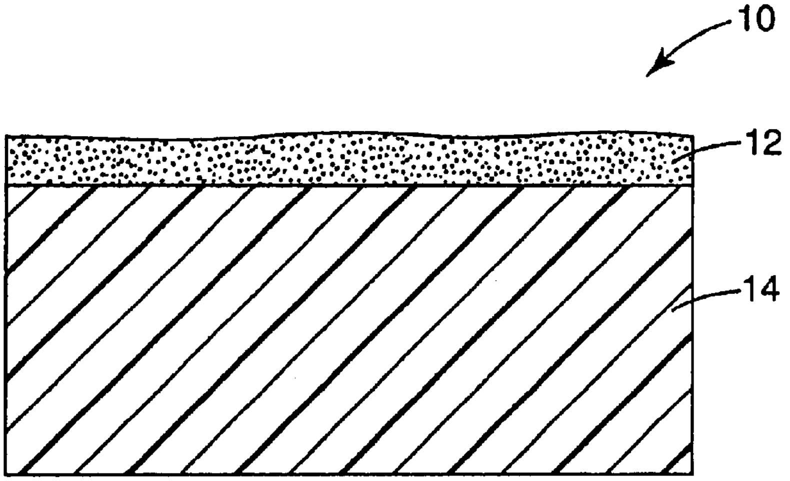
FIG. 1 depicts a representation of a Confocal microscopy cross section image, with a field of view ("FOV") of 30 square microns, of an ink jet printed vinyl film substrate (14). The depicted average thickness of the dried ink (12) is approximately 1.9 to 2.3 microns. In this photograph, the actual average ink thickness corresponds with the theoretical ink thickness, the theoretical ink thickness being calculated based on the application conditions and solvent content of the ink.
Figure 2:
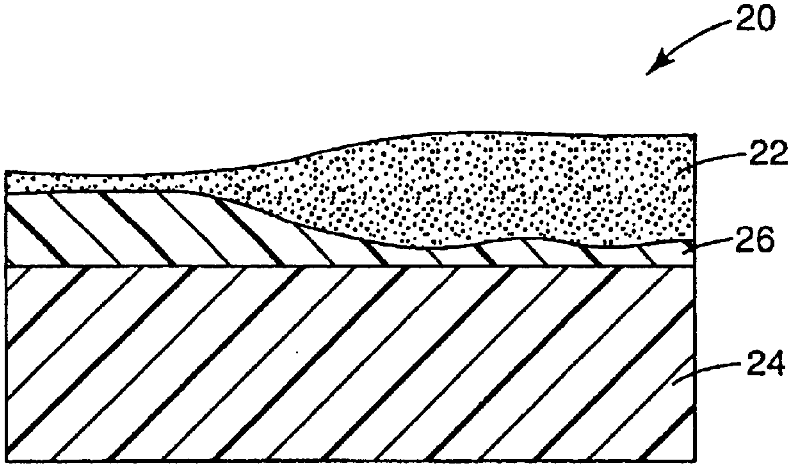
FIG. 2 depicts a representation of a Confocal microscopy cross section image, with a FOV of 30 square microns, of an ink jet printed substrate comprising a preferred primer, in accordance with the present invention. The substrate (24), ink composition (22) and ink jet print conditions were identical as employed in FIG. 1. The average thickness of the dried primer (26) is approximately 2.9 microns at the edge of the ink layer (22) where the thickness of the ink is very thin. The average thickness of the dried ink at the center of the printed area is approximately 4.2 to 5.1 microns, twice that of FIG. 1. Further, the average thickness of the primer layer is reduced to about 0.8 to 1.2 microns in the area directly beneath the region wherein the ink thickness increased. Hence, the average primer thickness is reduced by approximately the same thickness as the average increase in ink layer thickness.

The increase in ink layer thickness depicted in FIG. 2 is attributed to providing a primer composition that is soluble in the ink composition. Once the ink is jetted onto the primed substrate, the base polymer of the primer dissolves, at least in part, in the solvent of the ink, becoming an integral component of the ink composition. Accordingly, the base polymer of the primer is incorporated into the entirety of the ink composition (e.g. binder, solvent, pigment, optional additives). The applied ink jet composition significantly increases in polymeric binder concentration, relative to applying the same ink (under the same conditions) onto the same unprimed substrate. Concurrently, since a significant mass of the primer becomes incorporated in the ink composition, the overall mass and volume of the ink composition is increased, as evidenced by the increase in thickness of the ink layer, as depicted in FIG. 2.

Contrary to the teaching of the prior art directed to insoluble primer compositions, the present inventors have discovered that employing a primer composition that is soluble in the ink composition is advantageous. In one aspect, the dissolution of the base polymer of the primer in the solvent of the ink increases the viscosity of the ink, improving the ink uptake. This reduces the tendency of the ink to run, particularly when printed in a vertical position. The primed substrates of the present invention exhibit "good" ink uptake, meaning that no ink running or bleeding is observed when the ink is evaluated as described in the test method set forth in the forthcoming examples. The increase in viscosity of the applied ink jet ink also reduces overspreading of the ink dots.

In another aspect, the increase in ink layer thickness improves the day/night color balance. "Day/night color balance" refers to the appearance of printed media in daylight in comparison to being viewed at night with artificial back lighting. For example, signs used in advertising and corporate identity, typically have back lighting so the sign can be viewed at night. Such artificial back lighting results in a washed out appearance of the printed media (e.g. colored graphic). Accordingly, the imaged sign will appear darker when viewed in the daylight and lighter when viewed at night. Day/night color balance tends to correlate with thickness of the pigment layer (e.g. ink layer). The images of the present invention exhibit improved day/night color balance as a function of the increase in the ink layer caused by the dissolution and incorporation of the base polymer of the primer in the ink composition. Employing a soluble primer in combination with piezo ink jet compositions is a cost-effective means of improving the day/night color balance without having to resort to methods employing dual printing or dual print layers.

Further, the incorporation of the base polymer of the primer into the ink composition is surmised to improve the outdoor durability. "Durable for outdoor usage" refers to the ability of the article to withstand temperature extremes, exposure to moisture ranging from dew to rainstorms, and colorfast stability under sunlight's ultraviolet radiation. The threshold of durability is dependent upon the conditions to which the article is likely to be exposed and thus can vary. At minimum, however, the articles of the present invention do not delaminate or deteriorate when submersed in ambient temperature (25° C.) water for 24 hours, nor when exposed to temperatures (wet or dry) ranging from about −40° C. to about 140° F. (60° C.).

The outdoor durability of an ink or ink jetted image typically correlates to the weight average molecular weight (Mw) of the binder as well as the concentration of the binder in the ink. In view of the requisite low viscosity, piezo ink jet compositions typically comprise relatively low molecular weight binder(s) and/or relatively low concentration of binder(s). Accordingly, such ink compositions are less durable than compositions comprising a higher concentration of binder and/or higher molecular weight polymers, as is the case of the present invention wherein such ink jet inks are used in combination with a primer that is soluble in the ink. Further, for enhanced durability for outdoor usage, both the primer composition and ink composition are preferably aliphatic, being substantially free of aromatic ingredients.

The durability of commercial graphic films can be evaluated according to standard tests, such as ASTM D3424-98, Standard Test Methods for Evaluating the Lightfastness and Weatherability of Printed Matter and ASTM D2244-93 (2000), Standard Test Method for Calculation of Color Differences From Instrumentally Measured Color Coordinates. The commercial graphic films of the invention preferably exhibit less than a 20% change over the lifetime of the product. Commercial graphic films typically have a life span of 1 year, 3 years, 5 years, or 9 years depending on the end-use of the film.

In the case of signage for traffic control, the articles of the present invention are preferably sufficiently durable such that the articles are able to withstand at least one year and more preferably at least three years of weathering. This can be determined with ASTM D4956-99 Standard Specification of Retroreflective Sheeting for Traffic Control that describes the application-dependent minimum performance requirements, both initially and following accelerated outdoor weathering, of several types of retroreflective sheeting. Initially, the reflective substrate meets or exceeds the minimum coefficient of retroreflection. For Type I white sheetings ("engineering grade"), the minimum coefficient of retroreflection is 70 cd/fc/ft$^2$ at an observation angle of 0.2° and an entrance angle of −4°, whereas for Type III white sheetings ("high intensity") the minimum coefficient of retroreflection is 250 cd/fc/ft$^2$ at an observation angle of 0.2° and an entrance angle of −4°. In addition, minimum specifications for shrinkage, flexibility adhesion, impact resistance and gloss are preferably met. After accelerated outdoor weathering for 12, 24, or 36 months, depending on the sheeting type and application, the retroreflective sheeting preferably shows no appreciable cracking, scaling, pitting, blistering, edge lifting or curling, or more than 0.8 millimeters shrinkage or expansion following the specified testing period. Further, the weathered retroreflective articles preferably exhibit at least the minimum coefficient of retroreflection and colorfastness. For example, Type I "engineering grade" retroreflective sheeting intended for permanent signing applications retains at least 50% of the initial minimum coefficient of retroreflection after 24 months of outdoor weathering and Type III high intensity type retroreflective sheeting intended for permanent signing applications retains at least 80% of the initial minimum coefficient of retroreflection following 36 months of outdoor weathering in order to meet the specification. The coefficient of retroreflection values, both initially and following outdoor weathering, are typically about 50% lower in view on imaged retroreflective substrates.

In the method of the present invention, a substrate is provided that comprises a primed surface layer. The primed surface layer of the substrate is imaged with a non-aqueous, preferably solvent-based ink. The primed surface layer comprises a base polymer having a solubility parameter, molecular weight, and glass transition temperature (Tg) within a specified range. As used herein, "molecular weight" refers to weight average molecular weight (Mw), unless specified otherwise. The Applicant has found that base compositions having such physical properties outside this range typically detract from, rather than improve the overall image quality. Further, the primer composition is preferably soluble in the ink compositions.

In preferred embodiments, the primer composition is sufficiently soluble such that the ink layer exhibits a substantial increase in thickness, particularly at the center of the printed area. Further, the thickness of the primer layer, $t_1$, is typically reduced by an amount about equal to the increase in ink layer thickness. As used herein, with regard to describing the ink layer and primer layer, "thickness" refers to the dried thickness—after evaporation of any solvent. The actual ink layer thickness on the primed substrate is preferably greater than the theoretical ink thickness, $t_2$. The "theoretical ink thickness" refers to the thickness of the same ink on the same substrate, imaged under the same conditions with the proviso that the substrate is substantially free of primer. Provided that the substrate surface is non-porous and is substantially insoluble in the ink, the theoretical ink thickness can be calculated based on the application conditions and solvent content of the ink. For example, at 300 by 300 dots per inch (dpi) and 70 picoliter drop volume, the wet ink layer is calculated to be 20 microns at 200% ink coverage. For an ink that is 10% solids, the corresponding dry ink layer would be about 2 microns in thickness.

Without intending to be bound by theory, the Applicant surmises that if one were to analyze the various layers of the cross-section of FIG. 2 in more detail, one may find a compositional concentration gradient. The top surface of the ink layer may comprise nearly 100% ink. The intermediate region may comprise about equal concentrations of ink and primer with the concentration of base polymer of the primer increasing in the direction approaching the primer/substrate interface. For the purposes of the invention, however, the ink layer thickness refers to the average actual thickness of the colorant containing ink layer, $t_3$, as can be observed with Confocal microscopy. In further detail, the ink thickness can be determined by cutting a portion approximating 1 square cm from the sample of interest wherein approximately half of the sample is a solid block test pattern and the other half is unprinted. The portion is then cross-sectioned with a razor blade in a hand vice such that each cross-section has a portion of the interface between the printed and unprinted regions. A series of twenty Confocal Reflected Brightness (CRB) images are taken using a Leica TCS 4D Confocal, with a 50×/0.9 objective and a FOV ranging from about 30 by 30 microns to about 50 by 50 microns, of the sample portion as the sample portion is moved through focus. The images are then used to produce an extended focus image using a maximum intensity algorithm. Although Confocal microscopy is preferred, particularly for ink layer thicknesses of at least 1 micron, the ink layer thickness of layers of less than 1 micron can alternatively be determined with Scanning Electron Microscopy.

In preferred embodiments of the invention wherein the primer is soluble in the ink composition, the average actual ink layer thickness, $t_3$, typically increases by an amount of about 25% of the primer layer thickness, $t_1$, to an amount about equal to the sum of $t_2$ and $t_1$. The thickness of the primer layer typically ranges from about 0.10 microns to about 50 microns.

In general, the primer is present in an amount such that it provides the desired image quality and preferably the desired increase in ink layer thickness, as previously described. The thickness of the primer is preferably at least about 0.5 micron, more preferably at least about 1 micron, and most preferably at least about 2 microns. Hence, for preferred primer thicknesses, the ink layer increases by at least 0.5 microns, more preferably by at least 1.0 microns and most preferably by about 2 microns or greater. It is typically desirable to employ as little primer as needed, the thickness preferably being less than about 25 microns, more preferably less than about 10 microns, and most preferably less than about 5 microns. At too low of a primer thickness, the improvement contributed by the primer is diminished.

The solubility of the primer is primarily dependent on the base polymer of the primer composition and the liquid component (e.g. solvent) of the ink composition. In general, the absolute value of the difference between the solubility parameter of the primer composition and the solubility parameter of the ink (e.g. solvent of the ink) is less than about 1.5 $(cal/cm^3)^{1/2}$ [1 $(Mpa)^{1/2}$=0.49 $(cal/cm^3)^{1/2}$]. The solubility of various pure materials, such as solvents, polymers, and copolymers as well as mixtures are known. The solubility parameters of such materials are published in various articles and text books. In the present invention, the terminology "solubility parameter" refers to the Hildebrand solubility parameter which is a solubility parameter represented by the square root of the cohesive energy density of a material, having units of $(pressure)^{1/2}$, and being equal to $(\Delta H-RT)^{1/2}/V^{1/2}$ where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., *Handbook of Solubility and Other Cohesion Parameters*, $2^{nd}$ Ed. CRC Press, Boca Raton, Fla., (1991), for monomers and representative polymers in *Polymer Handbook*, $3^{rd}$ Ed., J. Brandrup & E. H. Immergut, Eds. John Wiley, NY pp 519–557 (1989), and for many commercially available polymers in Barton, A. F. M., *Handbook of Polymer-Liquid Interaction Parameters and Solubility Parameters*, CRC Press, Boca Raton, Fla., (1990).

Although preferred embodiments of the present invention are not bound by any particular ink composition, provided a soluble primer is employed that contributes the desired increase in ink layer thickness, the present invention is particularly useful for ink jet printing piezo inks. "Piezo ink" refers to an ink having a viscosity ranging from about 3 to about 30 centipoise at the printhead operating temperature. Such inks preferably have a viscosity below about 25 centipoise, and more preferably below about 20 centipoise at the desired ink jetting temperature (typically from ambient temperature up to about 65° C.). The characteristic low viscosity of such inks is surmised to attribute to the rapid dissolution and incorporation of the primer into the ink composition prior to the evaporation of the solvent.

Piezo ink jet compositions typically comprise a binder, plasticizer, organic solvent, pigment particles and optional additives such as surfactants (e.g. fluorochemical), antifoaming agent (e.g. silica and silicone oil), stabilizers, etc. Piezo ink jet compositions characteristically have moderate to low surface tension properties. Preferred formulations have a surface tension in the range of from about 20 mN/m to about 50 mN/m and more preferably in the range of from about 22 mN/m to about 40 mN/m at the printhead operating temperature. Further, piezo ink compositions typically have Newtonian or substantially Newtonian viscosity properties. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta=m\gamma^{n-1}$$

wherein $\upsilon$ is the shear viscosity, $\gamma$ is the shear rate in $s^{-1}$, m is a constant, and n is the power law index. The principles of the power law index are further described in C. W. Macosko, *Rheology: Principles, Measurements, and Applications*, ISBN #1-56081-579-5, p. 85.

Suitable piezo inks for use in the invention include ink compositions commercially available from Minnesota, Mining and Manufacturing ("3M"), St. Paul, Minn. under the trade designations "3M Scotchcal 3700 Series Inks" and "3M Scotchcal 4000 Series Inks" and ink compositions available from Ultraview Inkware of VUTEk, Meredith, N.H. under the trade designation "UltraVu". A preferred piezo ink jet composition is described in U.S. Pat. No. 6,113,679 (Adkins), incorporated herein by reference.

The solvent of the piezo ink composition may be a single solvent or a blend of solvents. Suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

In general, organic solvents tend to dry more readily and thus are preferred solvents for piezo ink compositions. As used herein, "organic solvent" refers to liquid having a solubility parameter greater than 7 $(cal/cm^3)^{1/2}$. Further, organic solvents typically have a boiling point of less than 250° C. and a vapor pressure of greater than 5 mm of mercury at 200° F. (93° C.). Highly volatile solvents, such as MEK and acetone, tend to be avoided, as such solvents dry too quickly resulting in nozzle clogging at the print heads. Further, highly polar solvents, such as low molecular weight alcohols and glycols, tend to have too high of a solubility parameter to sufficiently dissolve the primer.

Accordingly, the solubility parameter of the ink and hence the corresponding base polymer of the primer composition may vary, ranging from about 7 $(cal/cm^3)^{1/2}$ to about 12 $(cal/cm^3)^{1/2}$. Preferably, the solubility parameter of the ink is at least about 8 $(cal/cm^3)^{1/2}$ and less than about 10 $(cal/cm^3)^{1/2}$.

Regardless of whether the primer preferentially dissolves in the ink, the primer composition comprises a base polymer having a solubility parameter, Mw, and Tg within a specified range. The Applicant has found that these physical properties are contributing factors to good image quality. In the case of ink jet printing, in order to achieve good image quality the printed ink drops must spread to within an acceptable range in order to provide complete solid fill. If the ink drops do not spread enough, unfilled background areas will contribute to reduced color density and banding defects (i.e. gaps between the rows of ink drops). On the other hand, if the ink drops spread too much, loss of resolution and poor edge acuity is evident, and inter-color bleed occurs in the case of multi-color graphics. The image quality can be quantitatively expressed with reference to color density and with regard to the final ink dot diameter, as described in U.S. Pat. No. 4,914,451. The black color density is preferably at least about 1.5. The final ink dot diameter on the substrate is preferably greater than $[(2)^{1/2}]/$dpi but no more than 2/dpi, wherein dpi is the print resolution in dots per linear inch.

Further, the primer is chosen such that it exhibits good adhesion to the printed image such that the primer exhibits at least 50% adhesion and preferably at least 80% adhesion as measured according to ASTM D 3359-95A. Preferred primer compositions also exhibit sufficient adhesion to the substrate. The primer adhesion to the substrate can be evaluated in the same manner. However, in the case of poor primer adhesion to the substrate, both the ink and primer are removed from the substrate, rather than merely the ink. For embodiments wherein the primer composition exhibits good ink adhesion in combination with good substrate adhesion, additional bonding layers (e.g. tie layers, adhesive layers) are not required.

The primer composition comprises a base polymer. The base polymer may be a single polymer or a blend of polymers. The blend of polymers may form a homogeneous mixture or may be multiphase, exhibiting two or more distinct peaks when analyzed via differential scanning calorimetry (DSC). Further, the primer composition may comprise an interpenetrating network of the base polymer in an insoluble matrix or vice-versa. The primer compositions for use in the invention include solvent-based primer compositions, water-based primer compositions and radiation-curable primer compositions. Such primer compositions are typically unreactive with the ink composition.

The weight average molecular weight (Mw) of the base polymer as measured by Gas Permeation Chromotography (GPC) ranges from about 30,000 g/mole to about 400,000 g/mole. At too low of a molecular weight, the base polymer of the primer composition does not adequately thicken the ink composition upon dissolution. In such instances the ink may run when printed in a vertical orientation or the ink drops may exhibit feathering at the outer edges. At too high of a molecular weight, however, it become increasingly difficult to form a primer composition that is sufficiently low in viscosity such that it can be applied at low coating thicknesses.

The kind and amount of polymer(s) selected for use as the base polymer of the primer composition are chosen such that the primer composition exhibits a suitable viscosity for use in the intended application equipment. For example, if the primer is intended to be gravure coated, the kind and amount of base polymer(s) is chosen such that the primer composition will have a viscosity ranging from about 20 to about 1000 cps. In the case of knife coating and bar coating, however, the viscosity may range as high as 20,000 cps. For such embodiments, the primer may comprise a higher molecular weight base polymer and/or higher concentration of base polymer.

In general, higher molecular weight base polymer tends to produce the best resolution. Preferably the base polymer has a Mw of greater than about 60,000 g/mole, more preferably greater than about 80,000 g/mole, and most preferably greater than about 100,000 g/mole. In the case wherein the base polymer comprises a blend of two or more polymeric species, the Mw of the blend, for purposes of the present invention, refers to the Mw calculated in accordance with the following equation:

Mw (blend)=$\Sigma w_x M_x$; wherein $M_x$ is the weight average molecular weight of each polymeric species and $w_x$ is the weight fraction of such polymeric species with respect to the blend.

Accordingly, in the case of a bimodal blend, the Mw of the blend is typically a median value between the peaks.

In addition to the previously described solubility parameter and Mw, the base polymer of the primer composition of the invention ranges in glass transition temperature (Tg), as measured according to Differential Scanning Colorimetry (DSC) from about 30° C. to about 95° C. and preferably from about 50° C. to about 80° C. At a Tg of less than about 30° C., the base polymer is too soft such that dirt accumulates on the primed surface of the imaged article. At a Tg of greater than about 95° C., the primer coating is typically brittle such that the primer coating is susceptible to cracking upon being flexed or creased. In the case of primer compositions comprising two or more polymers wherein each has a distinct peak, the Tg of the blend, for purposes of the present invention, refers to the Tg calculated in accordance with the following equation:

1/Tg (blend)=$\Sigma w_x/Tg_x$; wherein $Tg_x$ is the Tg of each polymeric species and $w_x$ is the weight fraction of such polymeric species with respect to the blend. Tg values in the above equation are measured in degrees Kelvin.

The base polymer of the primer compositions typically comprises one or more film-forming resins. The selection of film-forming resin(s) is based on the Mw and Tg as well as the solubility of the base polymer in comparison to the solvent or liquid component of the ink, as previously described. Upon evaporation of the solvent and/or upon radiation curing, the primer composition typically forms a continuous film.

Various film-forming resins are known. Representative film-forming resins include acrylic resin(s), polyvinyl resin (s), polyester(s), polyacrylate(s), polyurethane(s) and mixtures thereof. Polyester resins include copolyester resins commercially available from Bostik Inc., Middleton, Mass. under the trade designation "Vitel 2300BG"; copolyester resins available from Eastman Chemical, Kingsport, Tenn. under the trade designation "Eastar" as well as other polyester resins available from Bayer, Pittsburg, Pa. under the trade designations "Multron" and "Desmophen"; Spectrum Alkyd & Resins Ltd., Mumbia, Maharshtra, India under the trade designation "Spectraalkyd" and Akzo Nobel, Chicago, Ill. under the trade designation "Setalin" alkyd.

Solvent-based primer compositions comprise the base polymer admixed with a solvent. The solvent may be a single solvent or a blend of solvents, as previously described with regard to the ink composition. The solvent-based primer composition preferably contains about 5 to about 60 parts by weight of the base polymer, more preferably about 10 to about 40 parts base polymer and most preferably about 10 to about 30 parts base polymer, with the remainder of the primer composition being solvent and optional additives.

Particularly in the case of solvent-based inks comprising acetate solvents and other solvents having similar solubility parameters, acrylic resins, polyvinyl resins and mixtures thereof are preferred film forming resins. Various acrylic resins are know. In general, acrylic resins are prepared from various (meth)acrylate monomers such as polymethylmethacrylate (PMMA), methyl methacrylate (MMA), ethyl acrylate (EA), butyl acrylate(BA), butyl methacrylate (BMA), n-butyl methacrylate (n-BMA) isobutylmethacrylate (IBMA), polyethylmethacrylate (PEMA), etc. alone or in combination with each other. Exemplary acrylic resins include those commercially available from Rohm and Haas, Co., Philadelphia, Pa. under the trade designation "Paraloid" and from Ineos Acrylics, Cordova, Tenn. under the trade designation "Elvacite" resins. Other suitable polyacrylic materials include those from S. C. Johnson, Racine, Wis. under the trade designation "Joncryl" acrylics. Polyvinyl resins include vinyl chloride/vinyl acetate copolymers, such as available from Rohm and Haas, Co., Philadelphia, Pa. under the trade designation "Acryloid" and from available from Union Carbide Corp., a subsidiary of The Dow Chemical Company ("Dow"), Midland Mich. under the trade designation "VYHH" as well as vinyl chloride/vinyl acetate/vinyl alcohol terpolymers also commercially available from Union Carbide Corp. under the trade designation "UCAR VAGH". Other polyvinyl chloride resins are available from Occidental Chemical, Los Angeles, Calif.; BF Goodrich Performance Materials, Cleveland, Ohio; and BASF, Mount Olive, N.J.

The water-based primers are preferably emulsions or dispersions that are substantially free of water soluble base polymers as a major component, since water soluble base polymers typically possess too high of a solubility parameter to be soluble in the organic solvent(s) of the ink composition. Water-based emulsions and dispersions are advantageous to reduce solvent emissions by employing primer compositions that are substantially free of volatile organic solvents. Although less preferred in view of its surmised insolubility in organic solvents, an exemplary water-based primer includes a crosslinked poly(meth) acrylate polymer such as a butyl acrylate/methyl methacrylate copolymer crosslinked with a sulfo-urethane-silanol polymer.

The radiation curable primer compositions comprise a single radiation curable monomer, oligomer, macromonomer, polymer or various mixtures of such components.

"Radiation curable" refers to functionality directly or indirectly pendant from the backbone that reacts (e.g. crosslink) upon exposure to a suitable source of curing energy. Suitable radiation crosslinkable groups include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are typically preferred. Of these, (meth)acryl moieties are most preferred. The term "(meth) acryl", as used herein, encompasses acryl and/or methacryl.

The energy source used for achieving crosslinking of the radiation curable functionality may be actinic (e.g., radiation having a wavelength in the ultraviolet (UV) or visible region of the spectrum), accelerated particles (e.g., electron beam (EB) radiation), thermal (e.g., heat or infrared radiation), or the like with UV and EB being preferred. Suitable sources of actinic radiation include mercury lamps, xenon lamps, carbon arc lamps, tungsten filament lamps, lasers, electron beam energy, sunlight, and the like.

The radiation curable ingredient may be mono-, di-, tri-, tetra- or otherwise multifunctional in terms of radiation curable moieties. The oligomers, macromonomers, and polymers may be straight-chained, branched, and/or cyclic with branched materials tending to have lower viscosity than straight-chain counterparts of comparable molecular weight.

A preferred radiation curable ink composition comprises a radiation curable reactive diluent, one or more oligomers (s), macromonomer(s) and polymer(s), and one or more optional adjuvants. For outdoor applications, polyurethane and acrylic-containing monomer(s), macromonomer(s), oligomer(s) and polymer(s) are preferred. The higher molecular weight species also tend to be readily soluble in reactive diluents.

Examples of commercially available (meth)acrylated urethanes and polyesters include those commercially available from Henkel Corp., Hoboken, N.J under the trade designation "Photomer"; commercially available from UCB Radcure Inc., Smyrna, Ga. under the trade designation "Ebecryl"; commercially available from Sartomer Co., Exton, Pa. under the trade designation "Sartomer CN"; commercially available from Akcross Chemicals, New Brunswick, N.J. under the trade designation "Actilane"; and commercially available from Morton International, Chicago, Ill. under the trade designation "Uvithane".

Provided that at least one of the ingredients is radiation curable, the radiation curable primer may comprise non-radiation curable ingredients as well. For example, polymers such as polyurethanes, acrylic material, polyesters, polyimides, polyamides, epoxies, polystryene as well as substituted polystyrene containing materials, silicone containing materials, fluorinated materials, combinations thereof, and the like, may be combined with reactive diluents (e.g. monomers).

Although less preferred in view of its surmised insolubility, an exemplary radiation curable primer includes a crosslinked poly(meth)acrylate polymer such as mixture of about equal proportions of urethane acrylate, tetrahydrofurfuryl acrylate and 2-(2-ethoxy)ethyl acrylate and a photoinitiator that has been crosslinked with an UV energy source.

The primer and ink composition may comprise a variety of optional additives. Such optional additives include one or more flow control agents, photoinitiators, colorants, slip modifiers, thixotropic agents, foaming agents, antifoaming agents, flow or other rheology control agents, waxes, oils, polymeric materializers, binders, antioxidants, photoinitiator stabilizers, dispersants, gloss agents, fungicides, bactericides, organic and/or inorganic filler particles, leveling agents, opacifiers, antistatic agents, dispersants, and the like.

Inorganic fillers such as crystalline and amorphous silica, aluminum silicate, and calcium carbonate, etc. are a preferred additive for the primer in order to impart increased surface roughness, reduced gloss and improved dot gain. The concentration of inorganic fillers typically ranges form about 0.1% to about 10% by weight and preferably from about 0.5% to about 5%. The particle size is preferably less than one micron, more preferably less 0.5 microns, and most preferably less than about 0.2 microns.

To enhance durability of the imaged substrate, especially in outdoor environments exposed to sunlight, a variety of commercially available stabilizing chemicals can be added optionally to the primer compositions. These stabilizers can be grouped into the following categories: heat stabilizers, UV light stabilizers, and free-radical scavengers.

Heat stabilizers are commonly used to protect the resulting image graphic against the effects of heat and are commercially availablefrom Witco Corp., Greenwich, Conn. under the trade designation "Mark V 1923" and Ferro Corp., Polymer Additives Div., Walton Hills, Ohio under the trade designations "Synpron 1163", "Ferro 1237" and "Ferro 1720". Such heat stabilizers can be present in amounts ranging from about 0.02 to about 0.15 weight percent.

Ultraviolet light stabilizers can be present in amounts ranging from about 0.1 to about 5 weight percent of the total primer or ink. Benzophenone type UV-absorbers are commercially available from BASF Corp., Parsippany, N.J. under the trade designation "Uvinol 400"; Cytec Industries, West Patterson, N.J. under the trade designation "Cyasorb UV1164" and Ciba Specialty Chemicals, Tarrytown, N.Y., under the trade designations "Tinuvin 900", "Tinuvin 123" and "Tinuvin 1130".

Free-radical scavengers can be present in an amount from about 0.05 to about 0.25 weight percent of the total primer composition. Nonlimiting examples of free-radical scavengers include hindered amine light stabilizer (HALS) compounds, hydroxylamines, sterically hindered phenols, and the like.

HALS compounds are commercially available from Ciba Specialty Chemicals under the trade designation "Tinuvin 292" and Cytec Industries under the trade designation "Cyasorb UV3581".

In general, the primer composition is typically substantially free of colorant, particularly when applied to the entire surface of the article. However, the primer may also contain colorants, the colored primer layer being suitable for use as a color layer. Alternatively, uncolored primer may be only applied directly beneath the image wherein the primed surface corresponds substantially identically in size and shape to the image.

For retroreflective sheeting, the primer composition as well as the ink composition (with the exception of ink compositions containing opaque colorants such as carbon black, titanium dioxide, or organic black dye) are typically transparent when measured according to ASTM 810 Standard Test Method for Coefficient of Retroreflection of Retroreflective Sheeting. That is, when coated onto retroreflective substrates, the visible light striking the surface of such films is transmitted through to the retroreflective sheeting components. This property makes the articles particularly useful for outdoor signing applications, in particular traffic control signing systems. Further, the dried and/or cured primer composition is substantially non-tacky such that the printed image is resistant to dirt build-up and the like.

Dyes are generally chosen based on their solubility with the polymeric material of the primer. Suitable dyes for acrylic-containing (e.g. crosslinked poly (meth)acrylate) primers include anthraquinone dyes, such as commercially available from Bayer Corp., Coatings and Colorants Division, Pittsburgh Pa. under the trade designation "Macrolex Red GN" and "Macrolex Green 5B" and commercially available from BASF Akt., Ludwigshafen, Germany under the trade designation "Thermoplast Red 334" and "Thermoplast Blue 684"; pyrazolone dyes, such as commercially available from BASF Akt. under the trade designation "Thermoplast Yellow 104"; and perinone dyes, such as commercially available from Bayer Corp. under the trade designation "Macrolex Orange 3G."

The articles of the present invention comprise a substrate comprising a primed surface layer and an image formed from an ink layer on the primed surface layer. The image may be text, graphics, coding (e.g. bar coding), etc., being comprised of a single color, multi-colored or being unapparent in the visible light spectrum. The image is preferably an ink jetted image. As used herein "ink jetted image" and "ink jet printed" both refer to an image created with an ink jet printing process employing a non-aqueous, solvent based piezo ink composition.

The article comprises a substrate wherein at least a portion of the surface comprises a primer composition forming a primed surface layer. For ease in manufacturing the entire surface of the substrate may comprise the primer composition. A non-aqueous solvent based ink is applied (e.g. ink jet printed) onto the primed surface and dried. In the simplest construction, the primer is disposed directly onto the substrate. In other embodiments, wherein additional coatings are employed, the primer is disposed between the substrate and the viewing surface of the article. For example, the article may comprise an additional topcoat or topfilm disposed over the imaged primer layer. Alternatively, the primer may be applied to the topfilm. The primed surface may then be reverse imaged and bonded to a second substrate. In preferred embodiments the primer, ink composition, as well as the entire article, exhibit good weatherability, being durable for outdoor usage. Preferably, the ink and primer composition are sufficiently durable such that additional protective layers are not required.

The article or substrate (e.g. film, sheet) has two major surfaces. The first surface, denoted herein as the "viewing surface" comprises the primer and the image (e.g. ink jetted image). The opposing surface of the article may also comprise a printed image forming a "second viewing surface". In such embodiments, the second viewing surface may also comprise a primer composition and an image. Alternatively, and most common however, the opposing surface is a non-viewing surface that typically comprises a pressure sensitive adhesive protected by a release liner. The release liner is subsequently removed and the imaged substrate (e.g. sheeting, film) is adhered to a target surface such as a sign backing, billboard, automobile, truck, airplane, building, awning, window, floor, etc.

The primer composition is suitable for use on a wide variety of substrates. Although the primer composition could be applied to substrates such as paper, upon exposure to rain, paper typically deteriorates and thus is not sufficiently durable for outdoor usage. Similarly, the primer composition could also be applied to a substrate or substrate layer having a low softening point, for example less than about 100° F. (38° C.). However, this construction would also exhibit poor durability. Accordingly, the substrate typically has a softening point greater than about 120° F. (49° C.), preferably greater than about 140° F. (60° C.), more preferably greater than about 160° F. (71° C.), even more preferably greater than about 180° F. (82° C.), and most preferably greater than about 200° F. (93° C.). Other materials that are typically unsuitable for use as the substrate include materials that corrode (e.g. oxidize) or dissolve in the presence of water such as various metals, metallic oxides, and salts.

Suitable materials for use as the substrate in the article of the invention include various sheets, preferably comprised of thermoplastic or thermosetting polymeric materials, such as films. Further, the primer is particularly advantageous for low surface energy substrates. "Low surface energy" refers to materials having a surface tension of less than about 50 dynes/cm (also equivalent to 50 milliNewtons/meter). The polymeric substrates are typically nonporous. However, microporous, apertured, as well as materials further comprising water-absorbing particles such as silica and/or superabsorbent polymers, may also be employed provided the substrate does not deteriorate or delaminate upon expose to water and temperature extremes, as previously described. Other suitable substrates include woven and nonwoven fabrics, particularly those comprised of synthetic fibers such as polyester, nylon, and polyolefins.

The substrates as well as the imaged article (e.g. sheets, films, polymeric materials) for use in the invention may be clear, translucent, or opaque. Further, the substrate and imaged article may be colorless, comprise a solid color or comprise a pattern of colors. Additionally, the substrate and imaged articles (e.g. films) may be transmissive, reflective, or retroreflective.

Representative examples of polymeric materials (e.g. sheet, films) for use as the substrate in the invention include single and multi-layer constructions of acrylic-containing films (e.g. poly(methyl) methacrylate [PMMA]), poly(vinyl chloride)-containing films, (e.g., vinyl, polymeric materialized vinyl, reinforced vinyl, vinyl/acrylic blends), poly(vinyl fluoride) containing films, urethane-containing films, melamine-containing films, polyvinyl butyral-containing films, polyolefin-containing films, polyester-containing films (e.g. polyethylene terephthalate) and polycarbonate-containing films. Further, the substrate may comprise copolymers of such polymeric species. Other particular films for use as the substrate in the invention include multi-layered films having an image reception layer comprising an acid- or acid/acrylate modified ethylene vinyl acetate resin, as disclosed in U.S. Pat. No. 5,721,086 (Emslander et al.). The image reception layer comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature. A preferred film for increased tear resistance includes multi-layer polyester/copolyester films such as those described in U.S. Pat. Nos. 5,591,530 and 5,422,189.

Depending of the choice of polymeric material and thickness of the substrate, the substrate (e.g. sheets, films) may be rigid or flexible. Preferred primer and ink compositions are preferably at least as flexible as the substrate. "Flexible" refers to the physical property wherein imaged primer layer having a thickness of 50 microns can be creased at 25° C. without any visible cracks in the imaged primer layer.

Commercially available films include a multitude of films typically used for signage and commercial graphic uses such as available from Minnesota Mining and Manufacturing Company ("3M") under the trade designations "Panaflex", "Nomad", "Scotchcal", "Scotchlite", "Controltac", and "Controltac Plus".

The primer compositions are made by mixing together the desired ingredients using any suitable technique. For example, in a one step approach, all of the ingredients are combined and blended, stirred, milled, or otherwise mixed to form a homogeneous composition. As another alternative, some of the components may be blended together in a first step. Then, in one or more additional steps, the remaining constituents of the component if any, and one or more additives may be incorporated into the composition via blending, milling, or other mixing technique.

During the manufacture of the articles of the invention, the primer composition is applied to a surface of the substrate. The primer may be applied with any suitable coating technique including screen printing, spraying, ink jetting, extrusion-die coating, flexographic printing, offset printing, gravure coating, knife coating, brushing, curtain coating, wire-wound rod coating, bar coating and the like. The primer is typically applied directly to the substrate. Alternatively, the primer may be coated onto a release liner and transfer coated onto the substrate. However, for embodiments wherein the primer surface is exposed and thus is non-tacky, additional bonding layers may be required.

After being coated, the solvent-based primer compositions are dried. The coated substrates are preferably dried at room temperature for at least 24 hours. Alternatively the coated substrates may be dried in a heated oven ranging in temperature from about 40° C. to about 70° C. for about 5 to about 20 minutes followed by room temperature drying for about 1 to 3 hours.

The imaged, polymeric sheets may be a finished product or an intermediate and are useful for a variety of articles including signage and commercial graphics films. Signage includes various retroreflective sheeting products for traffic control as well as non-retroreflective signage such as backlit signs.

The article is suitable for use as traffic signage, roll-up signs, flags, banners and other articles including other traffic warning items such as roll-up sheeting, cone wrap sheeting, post wrap sheeting, barrel wrap sheeting, license plate sheeting, barricade sheeting and sign sheeting; vehicle markings and segmented vehicle markings; pavement marking tapes and sheeting; as well as retroreflective tapes. The article is also useful in a wide variety of retroreflective safety devices including articles of clothing, construction work zone vests, life jackets, rainwear, logos, patches, promotional items, luggage, briefcases, book bags, backpacks, rafts, canes, umbrellas, animal collars, truck markings, trailer covers and curtains, etc.

Commercial graphic films include a variety of advertising, promotional, and corporate identity imaged films. The films typically comprise a pressure sensitive adhesive on the non-viewing surface in order that the films can be adhered to a target surface such as an automobile, truck, airplane, billboard, building, awning, window, floor, etc. Alternatively, imaged films lacking an adhesive are suitable for use as a banner, etc. that may be mechanically attached to building, for example, in order to display. The films in combination with any associated adhesive and/or line range in thickness from about 5 mils (0.127 mm) to as thick as can be accommodate by the printer (e.g. ink jet printer).

Objects and advantages of the invention are further illustrated by the following examples, but the particular materials and amounts thereof recited in the examples, as well as other conditions and details, should not be construed to unduly limit the invention. All parts, percentages and ratios herein are by weight unless otherwise specified.

TABLE A

Substrates Used in the Examples

| Abbreviation | "Trade Designation" | Source | Location |
|---|---|---|---|
| Polyester-based film | Prepared according to Example 29 of Patent Application No. 09/444907 filed Nov. 22, 1999. | 3M | St. Paul, MN |
| 3555 | "Scotchcal 3555" 4 mil vinyl film | 3M | St. Paul, MN |

TABLE A-continued

Substrates Used in the Examples

| Abbreviation | "Trade Designation" | Source | Location |
| --- | --- | --- | --- |
| HI | "Scotchlite High Intensity Grade Reflective Sheeting Series 3870" (PMMA) | 3M | St. Paul, MN |
| DG | "Scotchlite Diamond Grade LDP Reflective Sheeting Series 3970" (PMMA) | 3M | St. Paul, MN |
| 3540C | "Controltac Plus Changeable Graphic Film with Comply Performance 3540C" (vinyl) | 3M | St. Paul, MN |
| 180-10 | "Controltac Plus Graphic Film 180-10" (vinyl) | 3M | St. Paul, MN |
| VS0008 | "Scotchcal VS0008" 2 mil vinyl changeable graphic film | 3M | St. Paul, MN |
| Panaflex 930 | "Panaflex Awning and Sign Facing 930" (vinyl) | 3M | St. Paul, MN |
| 2033 | "Spunbond PET Non-woven Film Style 2033" | Reemay, Inc. | Old Hickory, TN |
| SP 700 | "Teslin SP 700"* | PPG Industries | Pittsburgh, PA |

*Teslin SP 700 = Microporous, high molecular weight polyethylene film filled with silica having a thickness of 177.8 microns.

TABLE B

Ingredients Used in the Primer Compositions of the Examples

| Chemical Description | "Trade Designation"/ Abbreviation | Source | Location |
| --- | --- | --- | --- |
| Film-forming Resins in Solution | | | |
| Vinyl resin and acrylic resin dissolved in solvent | "1910 DR Toner for 3M Scotchcal 1900 Series Inks" | 3M | St. Paul, MN |
| Acrylic resin dissolved in solvent | "880I Toner for 3M Scotchlite 880I Process Color Series Inks" | 3M | St. Paul, MN |
| 50 wt % solids solution of a butyl acrylate/methyl methacrylate copolymer in water | "UCAR 626" | Union Carbide Corp., a subsidiary of Dow | Midland, MI |
| Vinyl resin and acrylic resin dissolved in | BW9901 | 3M | St. Paul, MN |
| Aqueous dispersion of a sulfourethane-silanol polymer in water | SUS[1] | " | " |
| Radiation Curable Components | | | |
| Urethane acrylate diluted 15% with HDDA | "CN964B-85" | Sartomer Co. | Exton, PA |
| Tetrahydrofurfuryl acrylate | THFFA | Sartomer Co. | Exton, PA |
| 2-(2-Ethoxyethoxy)ethyl acrylate | EEEA | Sartomer Co. | Exton, PA |
| Isobornyl acrylate | IBOA | Sartomer Co. | Exton, PA |
| Additives | | | |
| Fluorescent whitening agent | "Uvitex OB" | Ciba Specialty Chemicals | Tarrytown, NY |
| 1-Hydroxycyclohexyl phenyl ketone and benzophenone as a 1:1 ratio by weight photoinitiator | "Irgacure 500" | Ciba Specialty Chemicals | Tarrytown, NY |
| Amorphous hydrophobic fumed silica | "CT-1110F" | Cabot Corp. | Tuscola, Il |

TABLE B-continued

Ingredients Used in the Primer Compositions of the Examples

| Chemical Description | "Trade Designation"/ Abbreviation | Source | Location |
| --- | --- | --- | --- |
| Acrylated silicone | "Tegorad 2500" | Goldschmidt Chemical Corp. | Hopewell, VA |

[1]SUS was prepared according to Example 38 of U.S. Pat. No. 5,929,160, employing the following modifications to component ratios and to the hydroxyl equivalent weight of the sulfopolyester polyol: The ratio of reagents was sulfopolyester polyol with a hydroxyl equivalent weight of 333:PCP 0201:ethylene glycol:isophorone diisocyanate (6.0:3.5:7.5:18.7).

Physical Properties of Acrylic and Vinyl Resins of the Primer Compositions

| Trade Name | Chemical Composition | Molecular Weight (Mw) G/mole | Tg (° C.) | Solubility Parameter (δ) $(cal/cm^3)^{1/2}$ |
| --- | --- | --- | --- | --- |
| "VYHH" | VC1/VAc (86/14) | 68,000 | 72 | 9.6 |
| "Acryloid A-11" | PMMA | 125,000 | 100 | 9.4 |
| "Paraloid B-44" | MMA/EA | 140,000 | 60 | 9.8 |
| "Paraloid B-48N" | MMA/BA | 250,000 | 50 | 9.3 |
| "Paraloid B-60" | MMA/BMA | 50,000 | 75 | 9.2 |
| "Paraloid B-66" | MMA/BMA | 70,000 | 50 | 9.0 |
| "Paraloid B-67" | IBMA | 60,000 | 50 | 8.6 |
| "Paraloid B-99N" | MMA/BMA | 15,000 | 80 | 9.4 |
| "Elvacite 2008" | PMMA | 37,000 | 105 | 9.4 |
| "Elvacite 2009" | PMMA | 83,000 | 87 | 9.4 |
| "Elvacite 2010" | PMMA | 84,000 | 98 | 9.4 |
| "Elvacite 2021" | MMA/EA 95-5 | 119,000 | 100 | 9.3 |
| "Elvacite 2041" | PMMA | 450,000 | 95 | 9.4 |
| "Elvacite 2042" | PEMA | 221,000 | 63 | 9.1 |
| "Elvacite 2044" | n-BMA | 140,000 | 15 | 9.0 |
| "Elvacite 2046" | n-BMA/IBMA | 165,000 | 35 | 9.2 |

"Acryloid A-11" is commercially available from Rohm and Haas Co. Philadelphia, PA.

Primer Compositions Used in the Examples

Solvent Based Primer Composition A ("Primer A") was a solution of 15% "Paraloid B-60" and 85% "CGS50".

Solvent Based Primer Composition B ("Primer B") was a solution of 15% "Paraloid B-67" and 85% "CGS50".

Solvent Based Primer Composition C ("Primer C") was a solution of 15% "Paraloid B-44" and 85% "CGS50".

Solvent Based Primer Composition D ("Primer D") was a solution of 15% "Paraloid B-66" and 85% "CGS50".

Solvent Based Primer Composition E ("Primer E") was a solution of 15% "Paraloid B-99N" and 85% "CGS50".

Solvent Based Primer Composition F ("Primer F") was a solution of 15% "Paraloid B-48N" and 85% "CGS50".

Solvent Based Primer Composition G ("Primer G") was a solution of 33% "1910 DR Toner for 3M Scotchcal 1900 Series Inks" and 67% "CGS50".

Solvent Based Primer Composition H ("Primer H") was a solution of 25% "880I Toner for 3M Scotchlite 8801 Process Color Series Inks" and 75% "CGS50".

Solvent Based Primer Composition I ("Primer I") was a solution of 16.6% "1910 DR Toner for 3M Scotchcal 1900 Series Inks" and 83.4% "CGS50".

Solvent Based Primer Composition J ("Primer J") was a solution of 15% "Elvacite 2008" and 85% "CGS50".

Solvent Based Primer Composition K ("Primer K") was a solution of 15% "Elvacite 2009" and 85% "CGS50".

Solvent Based Primer Composition L ("Primer L") was a solution of 15% "Elvacite 2010" and 85% "CGS50".

Solvent Based Primer Composition N ("Primer N") was a solution of 9% "Elvacite 2041" and 91% "CGS50".

Solvent Based Primer Composition O ("Primer O") was a solution of 15% "Elvacite 2044" and 85% "CGS50".

Solvent Based Primer Composition P ("Primer P") was a solution of 15% "Elvacite 2046" and 85% "CGS50".

Solvent Based Primer Composition Q ("Primer Q") was a solution of 15% "Elvacite 2042" and 85% "CGS50".

Solvent Based Primer Composition R ("Primer R") was a solution of 194 parts "BW9901", 6 parts cyclohexanone, 50 parts CGS10, 50 parts DPMA, and 0.5 parts "Uvitex OB".

Solvent Based Primer Composition S ("Primer S") was a solution of 25% "Paraloid B-67" and 75% "CGS50".

Solvent Based Primer Composition T ("Primer T") was a solution of 15% "VYHH" and 85% MEK.

Solvent Based Primer Composition U ("Primer U") was a solution of 20 parts "Elvacite 2042", 40 parts MEK, and 40 parts toluene.

Solvent Based Primer Composition V ("Primer V") was a solution of 99 parts Primer U and 1 part "CT-1110F".

Solvent Based Primer Composition W ("Primer W") was a solution of 95 parts Primer U and 5 parts "CT-1110F".

Water-based Primer Composition X ("Primer X") was a solution of 90% "UCAR 626" and 10% "SUS".

Radiation curable Primer Composition Y ("Primer Y") was a solution of 5 parts "CN964B-85", 5.55 parts THFFA, 5.55 parts EEEA, 5.55 parts IBOA, 1 part "Irgacure 500", and 0.1 parts "Tegorad 2500".

Solvent Based Primer Composition Pa ("Primer Pa") was a solution of 25% "Acryloid A-11", 25% MEK, 25% MIBK, and 25% toluene.

Solvent Based Primer Composition Pb ("Primer Pb") was a solution of 25% "Paraloid B-44", 25% MEK, 25% MIBK, and 25% toluene.

Solvent Based Primer Composition Pc ("Primer Pc") was a solution of 25% "Paraloid B-48N", 25% MEK, 25% MIBK, and 25% toluene.

Solvent Based Primer Composition Pd ("Primer Pd") was a solution of 25% "Elvacite 2042", 25% MEK, 25% MIBK, and 25% toluene.

Solvent Based Primer Composition Pe("Primer Pe") was a solution of 2 parts Primer Pa and 1 part Primer Pb.

Solvent Based Primer Composition Pf ("Primer Pf") was a solution of 1 parts Primer Pa and 2 part Primer Pb.

Solvent Based Primer Composition Pg ("Primer Pg") was a solution of 50% Primer Pa and 50% Primer Pb.

Solvent Based Primer Composition Ph ("Primer Ph") was a solution of 25% "Elvacite 2021", 25% MEK, 25% MIBK, and 25% toluene.

(Note—No "Primer M")

All primer compositions were prepared by placing all ingredients in a jar and allowing the mixture to roll on a jar roller overnight to provide a homogeneous solution.

Primer compositions A–Y were coated onto the substrate indicated in each example using a draw down method where a piece of substrate (e.g. film) approximately 25 cm by 20 cm in size was coated with the rod specified in each example. The coated substrate was allowed to dry in a 60° C. oven for 10 minutes, then allowed to air dry overnight before printing was performed.

For primer compositions Pa–Ph, a 14 inch (35.6 cm) wide roll of the substrate indicated in each example was coated with a gravure coater using either a 100 or a 150 line cylinder to deposit a dry film thicknesses of 5 microns or 2.5 microns respectively. The coater was run at a speed of 15 feet per minute, and a three zoned oven was used for drying the coatings. The oven zone temperatures were 77° C., 104° C., and 132° C. with each zone being 10 feet long.

Inks Used in the Examples

The ink used in all the printing experiments was "Scotchcal 3795" solvent based black piezo ink jet ink available from 3M unless specified otherwise.

Printing Method Used in the Examples

Printing was conducted on all the samples except Comparative Example 7 using the Xaar Jet XJ128-200 piezo printhead on an x-y stage at 317 by 295 dpi at room temperature. Two types of test patterns were used to evaluate the samples. The first test pattern consisted of solid fill squares and circles as well as lines and dots. This test pattern was printed at 100% coverage and used to evaluate image quality. The second test pattern was a solid block printed at 200% coverage and used to evaluate ink uptake and ink thickness.

Test Methods

1. Adhesion Evaluation Method

Percent adhesion ("Adhesion (%)") was the adhesion of the ink to the substrate or primer measured on the articles. The articles were conditioned at room temperature at least 24 hours prior to adhesion measurement, which was conducted according to the procedure set out in ASTM D 3359-95A Standard Test Methods for Measuring Adhesion by Tape Test, Method B.

2. Ink uptake Evaluation

Ink uptake was evaluated using the second test pattern. Once the printing was completed, the printed substrate was hung in a vertical position for 5 minutes. Ink uptake was rated "very poor" if the ink ran down the solid coverage areas past the printed boundaries, "poor" if the ink ran towards the bottom of the solid coverage areas causing the formation of a thickened ink layer at the bottom of the printed area, and "good" if no ink running or bleeding was observed.

3. Image Quality Evaluation

Image quality was evaluated using the first test pattern. Quantitative evaluation was accomplished using two types of measurements:

1) Solid block color density (CD) was measured using a Gretag SPM-55 densitometer, available from Gretag-MacBeth AG, Regensdorf, Switzerland. No background substraction was used, and the reported values were the average of three measurements. An increase in CD correlated to an increase or improvement in solid ink fill.

2) Dot size of an individual ink drop was measured using an optical microscope. The reported value was obtained by averaging the diameter of 6 different dots. For the print resolution employed in the examples (approximately 300 by 300 dpi), the theoretical ink dot diameter should be greater than $2^{1/2}$/dpi (120 microns) but no more than 2/dpi (170 microns). However, for the printing method used in the examples, optimum image quality was achieved when this range was increased by 20% to compensate for missing or misfiring nozzles and non-uniform ink drop size. Therefore, the practical optimum ink dot diameter ranged between 144 microns and 204 microns.

Qualitative evaluation of image quality was accomplished by observing resolution, feathering, and overall appearance of the test pattern. These qualitative evaluations were reported in the "comments" columns.

4. Ink Layer Thickness

In order to measure the printed ink layer thickness on the substrates, a confocal optical microscope was used. Portions of the second test pattern (solid block) approximately 1 $cm^2$ in size were cut from each sample wherein approximately half of the sample was the solid block test pattern and the other half was unprinted. The portions were then cross-sectioned with a razor blade in a hand vice such that each cross-section had a portion of the interface between the printed and unprinted region. A series of twenty Confocal Reflected Brightfield (CRB) images were taken as each sample was moved through focus. These images were then used to produce an extended focus image using a maximum intensity algorithm. Images were taken using the Leica TCS 4D Confocal with a 50×/0.9 objective. The Field of View (FOV) was recorded on each image. High magnification images (50×50 or 30×30 microns) were taken of the dried primer coating and ink layer of each sample evaluated.

In each of the examples, the letter designation (A, B, etc.) following the example number indicates the primer which was used. A variety of primer compositions are exemplified. Examples 1–20 employ solvent-based primers that comprise an acrylic resin, mixture of acrylic resins, or a vinyl resin on a variety of films. Example 21 employs a water-based primer, whereas in Example 22 a 100% solids radiation curable primer was used.

COMPARATIVE EXAMPLE 1 AND EXAMPLE 1U

Primer U was coated using the draw down method with a Meyer rod no. 6. Comparative Example 1 (unprimed) and Example 1U were ink jet printed, as previously described, onto unprimed and primed Panaflex 930. The black color density for Comparative Example 1 was 1.9, while Example 1U was 2.1. Both test patterns were evaluated for day/night color balance. Comparative Example 1, when viewed with a color box using back lighting appeared grayish and washed out with low gloss, while the primed film, Example 1U, had higher gloss and much greater black color density when viewed under the same conditions. The visual color density of Example 1U appeared unchanged when viewed with or without back lighting indicating good day/night color balance.

Confocal microscopy images showed that Primer U dissolved in the ink layer resulting in an actual ink layer thickness of 1.8–2.6 microns, whereas the theoretical ink layer thickness for 100% ink coverage is 1 micron.

Hence, this example illustrates that selecting a primer that dissolves in the ink leads to an increase in the thickness of the pigmented layer, which resulted in enhanced color density under backlit conditions.

COMPARATIVE EXAMPLE 2a AND EXAMPLES 2b–2h

The indicated primer was gravure coated onto VS008 film, as previously described, resulting in a dry primer coating thickness of 2.5 microns. Each sample was ink jet printed, as previously described. The image quality and ink uptake were as follows:

Primed VS0008 Films

| Ex. No. | Primer Used | Dot Size (microns) | Ink Uptake Rating | Comments |
|---|---|---|---|---|
| Comp. 2a | Pa | 209 | Very Poor | Too much flow, poor image quality |
| Comp. 2h | Ph | 208 | Very poor | Too much flow, poor image quality |
| 2b | Pb | 174 | Good | Excellent image quality |
| 2c | Pc | 159 | Good | Good resolution, some banding |
| 2d | Pd | 193 | Good | Excellent image quality and resolution |
| 2e | Pe | 205 | Good | Excellent image quality and color density, good resolution |
| 2f | Pf | 194 | Good | Excellent image quality and color density, good resolution |
| 2g | Pg | 197 | Good | Excellent image quality and color density, good resolution |

Examples 2b, 2c, 2d, 2g, and 2h were examined with confocal microscopy, as previously described and found to exhibit an increase in ink layer thickness due to the solubility of the base polymer of the primer in the ink composition. The confocal microscopy of Example 2c is set forth in FIG. 2, as a representative illustration.

Primer Pa contains "Acryloid A-11", whereas Primer Ph contains "Elvacite 2021" both of which have a Tg of 100° C. These ingredients alone exhibited poor ink uptake and poor image quality and thus are not good primers on VS0008 film due their high glass transition temperature. On the other hand, blending "Acryoid A11" with "Paraloid B-44", as in the case of Primers Pe, Pf, and Pg resulted in excellent image quality, ink uptake, and resolution since the Tg of the blend was within the preferred range in addition to the solubility parameter and Mw also being within the preferred range. Blends of "Elvacite 2021 " with "Paraloid B-44" would be expected to exhibit similar results.

COMPARATIVE EXAMPLE 3h AND EXAMPLES 3b, 3e AND 3f

The indicated primer was gravure coated onto 3555 film, as previously described, resulting in a dry primer coating thickness of 2.5 microns. Comparative Example 3h and Examples 3b, 3e, and 3f were ink jet printed, as previously described. The image quality and ink uptake were evaluated as follows:

Primed 3555 Films

| Ex. No. | Primer Used | Dot Size (microns) | Ink Uptake Rating | Comments |
|---|---|---|---|---|
| Comp. 3h | Ph | 215 | Very Poor | Too much flow, poor image quality |
| 3b | Pb | 151 | Good | Good image quality, and resolution |
| 3e | Pe | 159 | Good | Good image quality and resolution |
| 3f | Pf | 193 | Good | Good image quality and resolution |

Primer Ph contained "Elvacite 2021", having a high glass transition temperature of 100° C., did not provide for good image quality on 3555 vinyl film. However, primer compositions comprising a base polymer wherein the Tg, in addition to the solubility parameter and Mw were within the preferred range exhibited good image quality, as in the case of primer compositions Pb, Pe, and Pf.

COMPARATIVE EXAMPLE 4

Primer L was coated onto 180-10 film using the draw down method with Meyer rod nos. 3, 6, and 16 resulting in the indicated dry thicknesses. The image quality and ink uptake were as follows:

180-10 Primed with Primer L

| Primer L Thickness | Ink Uptake Rating | Dot Size (microns) | Comments |
|---|---|---|---|
| 0.5 microns | Very poor | 221 | Poor resolution and poor image |
| 1.0 microns | poor | 250 | Poor resolution and poor image |
| 2.7 microns | Good | 225 | Poor resolution and poor image |

Primer L resulted in poor image quality on 180-10 vinyl film since it contained "Elvacite 2010", a polymer having a high Tg (98° C.). Primer J was evaluated in the same manner and also resulted in poor image quality due to containing "Elvacite 2008", another polymer having too high of a Tg (105° C.).

COMPARATIVE EXAMPLE 5

Comparative Example 5 was prepared in the same manner as Example 4 except for using Primer O. The image quality and ink uptake results were as follows:

180-10 Primed with Primer O

| Primer O Thickness | Ink Uptake Rating | Dot Size (microns) | Comments |
|---|---|---|---|
| 0.5 microns | Good | 121 | Banding defects, low color density |
| 1.0 microns | Good | 123 | Banding defects, low color density |
| 2.7 microns | Good | 128 | Banding defects, low color density |

Primer O did not provide for good image quality on 180-10 vinyl film since it contained "Elvacite 2044", a base polymer having a low Tg (15° C.), below that of the preferred range.

COMPARATIVE EXAMPLE 6

Comparative Example 6 was prepared in the same manner as Example 4 except for using Primer N. The image quality and ink uptake results were as follows.

180-10 Primed with Primer N

| Primer N Thickness | Ink Uptake Rating | Dot Size (microns) | Comments |
|---|---|---|---|
| 0.5 microns | poor | 187 | Poor resolution |
| 1.0 microns | poor | 194 | Poor resolution |
| 2.3 microns | Very poor | 172 | Poor resolution and poor image |

Primer N did not provide for good image quality on vinyl film since it contained "Elvacite 204" (Mw 450,000 g/mole), having a Mw higher than that of the preferred range.

COMPARATIVE EXAMPLE 7

Primer Pb was gravure coated, as previously described, onto 3555 film resulting in dry coating thickness of approximately 5 microns. A water-based ink was applied using the Novajet 4 printer available from Encad Co., San Diego, Calif. The test pattern of circles was printed at 100%, 200% and 300% ink laydown. The resulting image was very poor with the ink drops beading on the surface. The ink uptake was very poor and the image smeared easily.

The primer did not work with water based inks due to the large difference in solubility parameter between the base polymer of the primer and the liquid component of the ink. The water-based ink used consisted mainly of water and perhaps small concentrations of glycols. Since the actual composition of the ink is unknown, the solubility parameter of the ink can not be calculated exactly. However, it can be assumed to be approximately equal to water, which has solubility parameter of 23.5 $(cal/cm^3)^{1/2}$, since the presence of small concentrations of glycols in the ink composition would only slightly reduce the solubility parameter. Accordingly, the difference between the primer/water solubility parameters is approximately 13.7 $(cal/cm^3)^{1/2}$ which is outside the preferred range.

COMPARATIVE EXAMPLE 8 AND EXAMPLES 8A–8F

The primers were coated with the draw down method using Meyer rod no. 6 and no. 12 to provide a dry primer layer thicknesses of 1 micron and 2 microns respectively. Comparative Example 8 and examples 8A–8F were ink jet printed, as previously described, onto primed 3540C film. The image quality and ink uptake were evaluated as follows:

Primed and Unprimed 3540C Film

| Ex. No. | Primer Dry Thickness | Dot Size | Ink Uptake Rating | Comments |
|---|---|---|---|---|
| Comp. 8 | No primer | 133 microns | Very poor | Low color density |
| 8A | 1 micron | 185 microns | Very poor | Improved color density |
| | 2 microns | 188 microns | Good | Good image quality |
| 8B | 1 micron | 200 microns | Poor | Improved color density |
| | 2 microns | 191 microns | Good | Good image quality |
| 8C | 1 micron | 158 microns | Poor | Improved color density |
| | 2 microns | 169 microns | Good | Good image quality |
| 8D | 1 micron | 181 microns | Poor | Improved color density |
| | 2 microns | 178 microns | Good | Good image quality |
| 8E | 1 micron | 170 microns | Good | Good color density, feathering defects and bleed |
| 8F | 1 micron | 156 microns | Good | Excellent resolution and density |
| | 2 microns | 172 microns | Good | Excellent resolution and density |

All primed films show improved dot gain and color density compared to the unprimed 3540C. Also, when coated at higher thickness, all primes show good ink uptake. Primer E, which contained "Paraloid B-99N" having a molecular weight of 15,000 g/mole, lower than the preferred range did not provide for good image quality.

COMPARATIVE EXAMPLES 9 AND 10 AND EXAMPLES 9F AND 10F

Comparative Examples 9 and 10 (unprimed) and Examples 9F and 10F were prepared as described in Example 8 using Meyer rod no. 6. The ink uptake was evaluated as follows:

Primed and Unprimed 3540C Film

| Ex. No. | Substrate | Ink Uptake Rating Comparative/ Unprimed | Ink Uptake Rating Primer F |
|---|---|---|---|
| Comp. 9 & 9F | HI | Very poor | Good |
| Comp. 10 & 10F | DG | Very poor | Good |

These examples demonstrate that coating a retroreflective substrate with a thin primer layer dramatically improved ink uptake. The dry coating layer was roughly measured to be about 1 micron, while at 200% ink coverage the printed ink layer prior to the evaporation of the solvent on the substrate was 20 microns thick. It is a surprising result that a 1 micron coating can hold a 20 micron layer of ink. It is surmised that the dissolution of the primer in the ink resulted in a large increase in ink viscosity, which prevented the ink from running down the film.

COMPARATIVE EXAMPLE 11 AND EXAMPLE 11G

Comparative Example 11 (unprimed) and Example 11 G were prepared as described in Example 8 using SP 700 film as the substrate and Meyer rod no. 6. The first test pattern was printed on each substrate. The results were as follows.

Substrate SP 700 Primed with Primer G

| Ex. No. | Black Color Density | Dot Size (Microns) |
|---|---|---|
| Comp. 11 | 1.29 | 116 |
| 11G | 1.51 | 235 |

The data showed a marked increase in color density and dot size of the printed image on Primer G coated SP 700 in comparison to the printed image on unprimed SP 700.

COMPARATIVE EXAMPLE 12 AND EXAMPLES 12H AND 12I

The 2033 substrate was unprimed, coated with Primer H, or coated with Primer I. The primed substrates were prepared by hand spraying the primer solution using a hand-held spray bottle. After drying, the primed 2033 was weighed and had a coating weight of approximately 0.0039 g/cm$^2$. The printed image on unprimed 2033 showed poor resolution with ink wicking along the fibers of the sheet. The text was not readable and the lines were not resolved. On the other hand, the printed image on the substrates coated with either Primer H or Primer I showed marked improvement in image sharpness, line resolution and text readability. The black color density was measured. It was 0.89 on the unprimed film, and 0.97 and 0.93 on Ex. No. 12H and 121 respectively, demonstrating the improvement contributed by the presence of the prime.

EXAMPLE 13

Example 13 was prepared in the same manner as Example 4 except Primer K was used. The results were as follows.

180-10 Primed with Primer K

| Primer K Thickness | Ink Uptake Rating | Dot Size (microns) | Comments |
|---|---|---|---|
| 0.5 microns | Good | 207 | Excellent resolution and good image |
| 1.0 microns | Good | 193 | Excellent resolution and good image |
| 2.7 microns | Good | 180 | Excellent resolution and good image |

EXAMPLE 14

Example 14 was prepared in the same manner as Example 4 except for using Primer P. The results were as follows:

Substrate 180-10 Primed with Primer P

| Primer P Thickness | Ink Uptake Rating | Dot Size (microns) | Comments |
|---|---|---|---|
| 0.5 microns | Good | 171 | Good resolution, some banding |
| 1.0 microns | Good | 165 | Good resolution, some banding |
| 2.7 microns | Good | 166 | Good resolution, some banding |

EXAMPLE 15

Example 15 was prepared in the same manner as Example 4 except for using Primer Q. The results were as follows.

180-10 Primed with Primer Q

| Primer Q Thickness | Ink Uptake Rating | Dot Size (microns) | Comments |
|---|---|---|---|
| 0.5 microns | Good | 172 | Good resolution and good image |
| 1.0 microns | Good | 168 | Good resolution and good image |
| 2.7 microns | Good | 181 | Good resolution and good image |

EXAMPLE 16

Example 16 was prepared in the same manner as example 4 except for using Primer S. The results were as follows.

Substrate 180-10 Primed with Primer S

| Primer T Thickness | Ink Uptake Rating | Dot Size (microns) | Comments |
|---|---|---|---|
| 1.1 microns | Good | 211 | Excellent resolution and good image |
| 2.9 microns | Good | 209 | Excellent resolution and good image |

EXAMPLE 17

Example 17 was prepared in the same manner as example 4 except for using Primer T. The results were as follows.

Substrate 180-10 Primed with Primer T

| Primer T Thickness | Ink Uptake Rating | Dot Size (microns) | Comments |
|---|---|---|---|
| 0.5 microns | Good | 157 | Good resolution, some banding |
| 1.0 microns | Good | 194 | Good resolution and good image |
| 2.7 microns | Good | 190 | Good resolution and good image |

In each of Examples 13–17, the primer comprised a base polymer having a Tg, Mw and solubility parameter within the desired ranges and thus the primer composition provided good image quality and good ink uptake.

EXAMPLE 18

Primer R was drawn down with a Meyer rod no. 20 on the polyester based film. The solid block pattern was printed at 100% ink laydown with "Scotchcal 3795!" (black), "Scotchcal 3796" (cyan), "Scotchcal 3792" (yellow), and "Scotchca 3791" (magenta); all commercially available from 3M.

The adhesion of all four inks on the unprimed polyester based film was 0%. Adhesion of all four inks on the polyester based film with Primer R was 100% and the image quality was good with high gloss images and sharp edges.

COMPARATIVE EXAMPLE 19 AND EXAMPLES 19b AND 19c

Comparative Example 19 (unprimed) and Examples 19b and 19c were prepared by gravure coating primer Pb onto 3540C film, resulting in dry coating thickness of approximately 2.5 microns. The image quality and ink uptake was evaluated as follows.

Unprimed and Primed 3540C Films

| Ex. No. | Primer Used | Dot Size (microns) | Ink Uptake Rating | Comments |
|---|---|---|---|---|
| Comp. 19 | None | 132 | Very Poor | Low color density and poor image |
| 19b | Pb | 171 | Good | Good image quality, and resolution, improved color density |
| 19c | Pc | 158 | Good | Excellent image quality and resolution, Excellent color density |

This illustrates yet another example wherein primer compositions comprising a base polymer having a Tg, Mw, and solubility parameter within the desired range contribute good ink uptake and improved image quality.

COMPARATIVE EXAMPLE 20 AND EXAMPLES 20U, 20V AND 20W

Comparative Example 20 (unprimed) and Examples 20U, 20V and 20W were prepared by drawing down the indicated primer onto 3540C film using Meyer rod no. 6. The results are shown as follows.

Unprimed and Primed 3540C Films

| Ex. No. | CD | Dot Size (microns) | Ink Uptake Rating |
|---|---|---|---|
| Comp. 19 | 1.41 | 134 | Very poor |
| 20U | 1.98 | 177 | Good |
| 20V | 2.21 | 199 | Good |
| 20W | 2.28 | 200 | Good |

Priming 3540C with "Elvacite 2042" dramatically improved ink uptake, dot gain, and color density. However, adding fumed silica particles to Primer U, as in the case of Primers V and W, further increased dot gain and improved color density without detracting from the good ink uptake.

COMPARATIVE EXAMPLE 21 AND EXAMPLE 21X

Comparative Example 21 (unprimed) and Example 21X were prepared by drawing down Primer X onto the polyester based film using Meyer rod no. 6. The results were as follows:

Polyester Based Film Primed with Primer X

| Ex. No. | Ink Uptake Rating | Ink Adhesion |
|---|---|---|
| Comp. 21 | Very poor | 0% |
| 21X | Good | 100% |

The data showed that priming with Primer X dramatically improves ink adhesion and uptake on polyester based film. It was found that the crosslinking component, SUS, was preferred in order to obtain 100% adhesion of the primer onto this substrate.

EXAMPLE 22

Example 22Y was prepared by drawing down Primer Y onto the polyester based film using Meyer rod no. 6. The primer was then cured using the Fusion Systems UV Processor, commercially available from Fusion Systems Inc., Gaithersburg, Md. The radiation dose was 240 $mJ/cm^2$. The ink uptake was good with good image quality and resolution. Adhesion of the ink was 100% onto the primer.

Although Examples 21 and 22 employ a base polymer having the requisite solubility parameter, molecular weight, and Tg, these examples are less preferred in view of their surmised insolubility in the solvent of the ink. Accordingly, these two examples would not exhibit an increase in ink layer thickness.

What is claimed is:

1. An imaged article comprising:

a) a substrate comprising a primed surface layer having an average thickness of $t_1$;

b) a non-aqueous ink layer on said primed surface, said ink layer having a theoretical dry thickness of $t_2$ and an actual average dry thickness of $t_3$;

wherein $t_3$ is greater than $t_2$.

2. The article of claim, 1 wherein $t_3$ is greater than $t_2$ by an amount ranging from about 25% of $t_1$ to an amount about equal to the sum of $t_2$ and $t_1$.

3. The article of claim 1 wherein $t_3$ is greater than $t_2$ by an amount of at least 50% of $t_1$.

4. The article of claim 1 wherein the ink layer comprises an ink jetted image.

5. The article of claim 1 wherein $t_3$ is at least about 0.5 microns greater than $t_2$.

6. The article of claim 1 wherein $t_3$ is at least about 1.0 micron greater than $t_2$.

7. The article of claim 1 wherein $t_3$ is at least about 2.0 microns greater than $t_2$.

8. The article of claim 1 wherein the substrate comprises a polymeric sheet material.

9. The article of claim 1 wherein the polymeric sheet material is at least one of an acrylic-containing film, a poly(vinyl chloride)-containing film, a poly(vinyl fluoride)-containing film, a urethane-containing film, a melamine-containing film, a polyvinyl butyral-containing film, a polyolefin-containing film, a polyester-containing film and a polycarbonate-containing film.

10. The article of claim 1 wherein the sheet comprises a retroreflective viewing surface.

11. The article of claim 1 wherein the ink layer exhibits an improvement in overall image quality in comparison to the same image ink jetted on the same substrate, said substrate being unprimed.

12. The article of claim 1 wherein the ink layer has a black color density of at least about 1.5.

13. The article of claim 1 wherein the ink layer has an ink dot diameter of at least $[(2)^{1/2}]$/dpi wherein dpi in the print resolution is dots per linear inch.

14. The article of claim 1 wherein the ink layer comprises an ink that exhibits at least about 80% adhesion to the primed surface portion according to ASTM D 3359-95A.

15. The article of claim 1 wherein the primed surface portion comprises a primer that exhibits at least about 80% adhesion to the sheet according to ASTM D 3359-95A.

16. The article of claim 1 wherein the primed surface comprises at least onc of an acrylic resin, vinyl resin or mixture thereof.

17. The articlc of claim 1 wherein the primed surface portion comprises at least one colorant.

18. Signage comprising the article of claim 1.

19. Commercial graphic film comprising the article of claim 1.

20. The imaged article of claim 1 wherein the ink layer comprising pigment particles.

21. An imaged article comprising:

a) a substrate comprising a primed surface layer having an average thickness of $t_1$;

b) a solvent-based piezo ink layer comprising pigment particles on said primed surface, said ink layer having a theoretical dry thickness of $t_2$ and an actual average dry thickness of $t_3$;

wherein $t_3$ is greater than $t_2$.

22. The article of claim 1 wherein the ink is a solvent-based piezo ink.

* * * * *

UNITED STATES PATENT AND TRADEMARK OFFICE

CERTIFICATE OF CORRECTION

PATENT NO. : 6,896,944 B2 Page 1 of 1

DATED : May 24, 2005

INVENTOR(S) : Ylitalo, Caroline M. et al.

It is certified that error appears in the above-identified patent and that said Letters Patent is hereby corrected as shown below:

<u>Column 8,</u>
Line 23, delete "υ" and insert -- η --, therefor.

<u>Column 11,</u>
Lines 53-63, delete ""Radiation ..................... and /or methacryl" and insert the same on line 52 after "components." as continuation of para.

<u>Column 18,</u>
Line 61, delete "8801" and insert -- 880I --, therefor.

<u>Column 23,</u>
Line 66, delete "204" (Mw 450,000 g/mole)" and insert -- 2041" (Mw = 450,000 g/mole) --, therefor.

<u>Column 25,</u>
Line 65, delete "121" and insert -- 12I --, therefor.

<u>Column 27,</u>
Line 24, delete "3795!" and insert -- 3795 --, therefor.

<u>Column 28,</u>
Line 63, after "claim" delete ",".

<u>Column 30,</u>
Line 8, delete "onc" and insert -- one --, therefor.
Line 10, delete "articlc" and insert -- article --, therefor.

Signed and Sealed this

Nineteenth Day of July, 2005

JON W. DUDAS

*Director of the United States Patent and Trademark Office*